United States Patent [19]

Hamner

[11] Patent Number: 4,515,543

[45] Date of Patent: May 7, 1985

[54] IN-MOLD COATING PART EJECTION SYSTEM

[75] Inventor: James R. Hamner, Sterling Heights, Mich.

[73] Assignee: The Budd Co., Troy, Mich.

[21] Appl. No.: 528,947

[22] Filed: Sep. 2, 1983

[51] Int. Cl.³ .......................... B29C 1/00; B29G 1/00
[52] U.S. Cl. .................................. 425/112; 249/66 R; 249/117; 249/122; 425/127; 425/130; 425/129 R; 425/556
[58] Field of Search ................ 425/112, 127, 129 R, 425/543, 556, 356, 351, 412, 438, 444, 554, 117, 130; 249/117, 122, 142, 66 R

[56] References Cited

U.S. PATENT DOCUMENTS

| | | | |
|---|---|---|---|
| 3,555,606 | 1/1971 | Hedgewick | 425/556 |
| 3,669,598 | 6/1972 | Tucker | 425/438 |
| 3,712,787 | 1/1973 | Barnes | 425/438 |
| 3,776,676 | 12/1973 | Kessler | 425/250 |
| 3,893,644 | 7/1975 | Drazick | 249/68 |
| 3,982,875 | 9/1976 | Abey | 425/444 |
| 4,009,978 | 3/1977 | Hanning | 425/98 |
| 4,009,979 | 3/1977 | Martin | 425/107 |
| 4,061,455 | 12/1977 | Von Holdt | 425/112 |
| 4,403,933 | 9/1983 | Davis et al. | 425/129 R |
| 4,438,062 | 3/1984 | Griffith et al. | 264/255 |

FOREIGN PATENT DOCUMENTS 2046227 11/1980 United Kingdom ............... 264/318

OTHER PUBLICATIONS

"Class A Finish on SMC", Bernie Miller, Plastics World, Mar. 1978, p. 48.

Primary Examiner—Willard E. Hoag
Attorney, Agent, or Firm—Harness, Dickey & Pierce

[57] ABSTRACT

A method and apparatus are disclosed for in-mold coating plastic parts which find particular utility in compression molding sheet molded compound (SMC) exterior automotive body panels. The mold members are configured so as to provide a down turned flange for the part at its outer extremities. The male mold member includes an undercut portion for securing the part to the male mold when the female mold is raised to allow injection of the coating material. The part is ultimately ejected from the male mold by way of blades which press upwardly on the down turned flange thereby lifting it from its undercut portion and releasing the part from the mold. By confining the ejector blade contact to the flange, extremely smooth, high quality finishes for the major surface of the part can be achieved.

10 Claims, 8 Drawing Figures

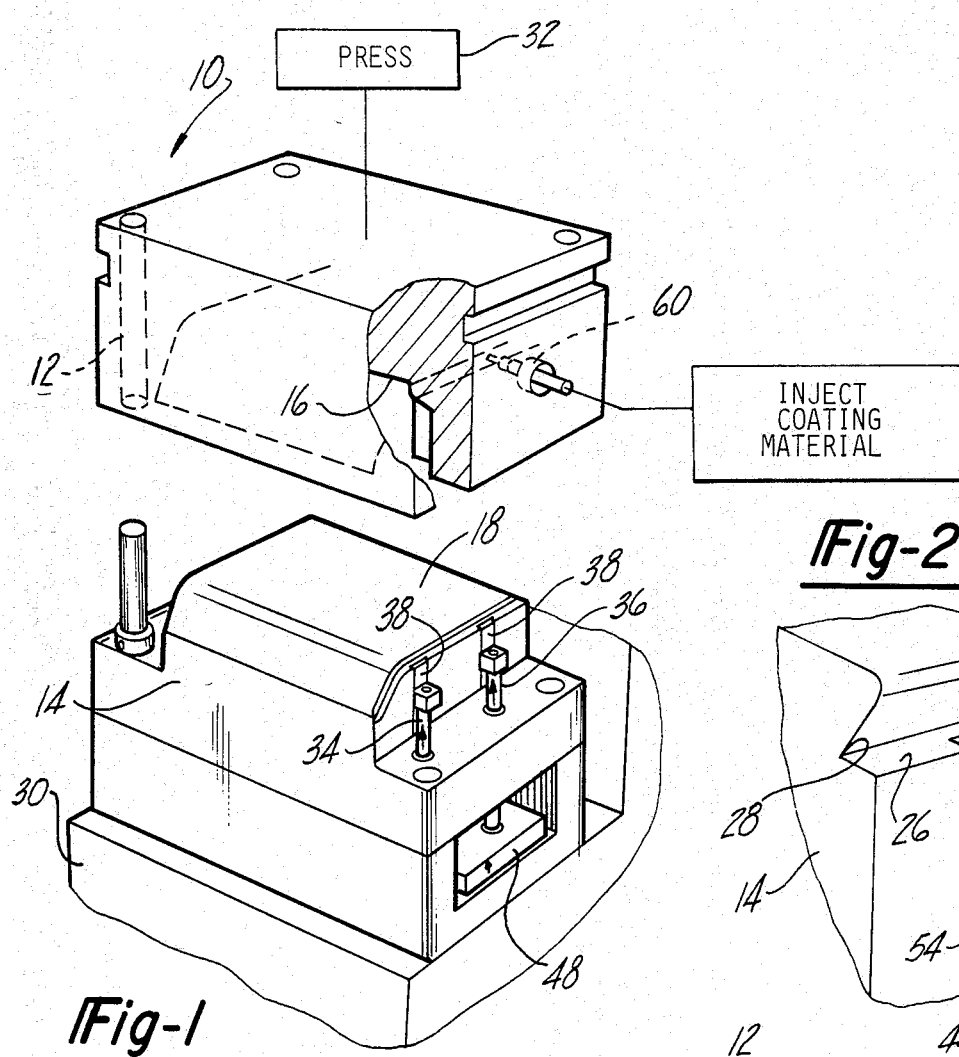
*Fig-1*
*Fig-2*
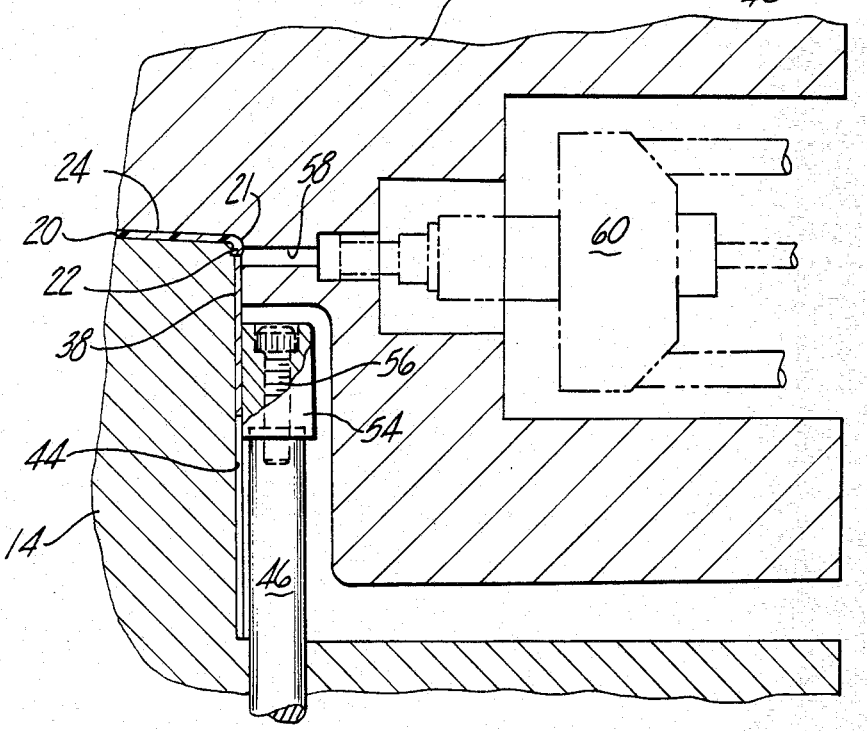
*Fig-3*

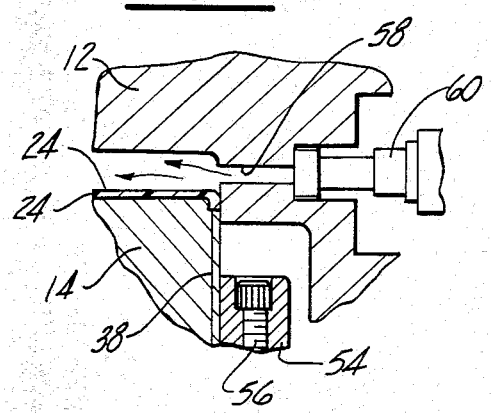
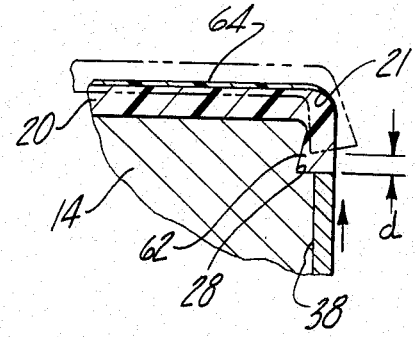
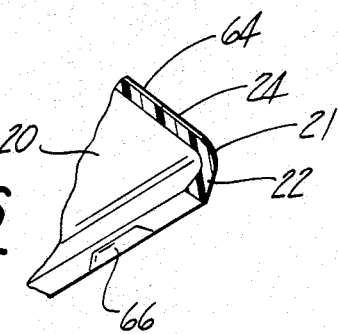
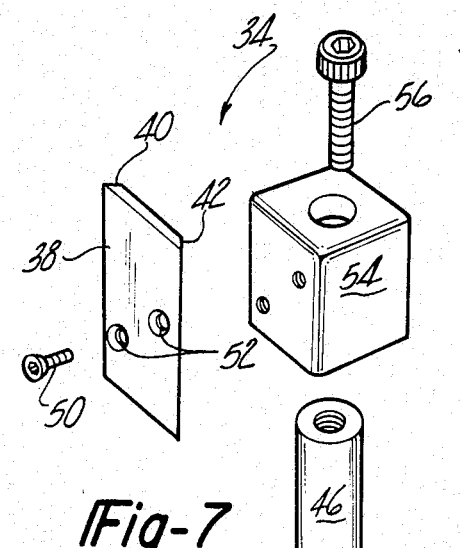
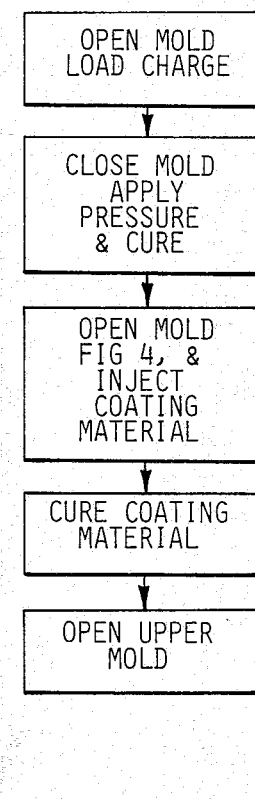

IN-MOLD COATING PART EJECTION SYSTEM

TECHNICAL FIELD

This invention relates to a method and apparatus for molding plastic parts. More particularly, it relates to techniques for in-mold coating SMC exterior automotive body panels so as to achieve smooth, high quality surfaces.

BACKGROUND ART

Sheet molded compound (SMC) parts are being increasingly investigated for use as replacements for conventional steel exterior automotive body panels such as rear deck lids, hoods, roof panels and, to some extent, doors. These exterior body panels are characterized by a generally flat large major surface. It has been difficult to provide these panels with smooth, pit free high quality finishes (referred to as Class A finishes in the industry) using conventional SMC compression molding techniques. Flaws or other surface deviations in the part after molding often require the use of filling and hand finishing operations to achieve the desired surface quality.

In recent years a process called "In-Mold Coating" has been delayed for the purpose of improving the surface quality of SMC parts. Basically, the in-mold coating process employs an additional operation whereby a coating material is injected onto the part while the molds are partially open. The molds are then reclosed and the coating material flows over the part surface filling pits, pores and cracks providing a nearly blemish-free coated surface.

Unfortunately, several problems have been encountered with this process. For example, the conventional use of ejector pins pressing against the underside of the major flat surface of the part to eject it from the mold often causes deformations that "telescope" or show through the upper coated surface thereby destroying its high quality finish. Another problem is that the part has a tendency to lift off of the lower male mold when the molds are opened to allow injection of the coating material. The resulting shifting or lifting of the part creates suction that may lodge debris underneath the part and cause further distortion when the molds are reclosed. If the part lifts a sufficient distance from the lower mold the coating material may actually be injected underneath the part instead of on its upper surface. In some instances this problem can also result in breaking or cracking the part when the molds are reclosed during curing of the coating material.

SUMMARY OF THE INVENTION

Pursuant to the present invention the mold cavity is shaped so as to provide a down turned flange on the extremities of the part. The male mold member is further provided with an undercut portion which extends transversely to the path of travel of the mold members. A charge of thermosetting plastic material is inserted between the molds which are closed and heated under pressure to cure the part. The undercut creates a lip in the flange which secures the part onto the male mold when the molds are subsequently opened to allow injection of the coating material onto the top surface of the part. The molds are then closed to cure the coating material. After curing, the coated part is released from the mold by ejection means pressing upwardly on the down turned flange instead of on the underside of the coated flat surface as done in the past. Consequently, distortion or blemishes on the coated major surface of the part are substantially eliminated or at least very difficult to detect.

BRIEF DESCRIPTION OF THE DRAWING

These and various other advantages of the present invention will become apparent to those skilled in the art by reading the following specification and by reference to the drawings in which:

FIG. 1 is a perspective view of molding apparatus made in accordance with the present invention;

FIG. 2 is an enlarged perspective view of a portion of the male mold member;

FIG. 3 is a cross-sectional view showing the mold in a closed condition;

FIG. 4 is a cross-sectional view showing the mold partially opened to allow injection of the coating material onto the top surface of the part;

FIG. 5 is a cross-sectional view showing in phantom lines the part being lifted from the male mold member;

FIG. 6 is a partial perspective view of an edge of the part;

FIG. 7 is an exploded perspective view of an ejection device employed in the preferred embodiment; and FIG. 8 is a flow chart illustrating the sequence of steps carried out during the method of the preferred embodiment.

DESCRIPTION OF THE PREFERRED EMBODIMENT

Referring now to the drawings, molding apparatus 10 includes an upper female mold 12 and a lower male mold 14. Upper mold 12 and lower mold 14 have complimentary surfaces 16 and 18, respectively, defining a cavity corresponding in shape to the part desired to be made. The molds are preferably designed to produce exterior automotive body panels and, in the embodiment illustrated in drawings, is designed to produce a rear deck lid. Parts of these types are characterized by a relatively large generally flat outer major surface whose finish is desired to be as smooth as possible so as to provide a Class A finish having very little surface deviations. In the drawings, the part bears the reference numeral 20.

The margins of the upper mold 12 and lower mold 14 are designed so as to provide a down turned flange 22 on the sides of the part 20. Flange 22 extends normally to the major surface 24 of the part and is located beneath a radius 21 defining rounded peripheral corners for part 20. A ledge 26 is cut into upper corner portions of lower mold 14 for the purpose of cooperating with upper mold 12 to define the flange 22. Ledge 26 is advantageously provided with an undercut portion 28 which extends generally in a plane normal to the path of relative travel between the upper mold 12 and lower mold 14.

Lower mold 14 is fixed to a stationary base 30 whereas upper mold 12 is connected to a conventional hydraulically operated press 32 for raising and lowering upper mold 12 in a manner known in the art. Provision is also made for heating the mold in a conventional manner. Typically, this will entail the inclusion of passageways (not shown) in the molds for passing heated water, steam or oil therethrough to heat the molds to the desired temperature.

A plurality of ejector devices are located on the sides of lower mold 14 beneath down turned flange portion 22 of the part 20. In the drawings, there are two ejector devices 34 and 36 shown on one side of mold 14. However, it should be understood that more than two such devices will actually be used depending upon the size of the part, at least a pair of ejector devices being preferably provided on two opposing sides of the part. All of the ejector devices are substantially identical and thus the description of one of them will suffice.

Each ejector device includes a blade 38 having dove tailed edges 40 and 42 which diverge outwardly from an outer vertical face to an inner vertical face. Blade 38 rides in a complimentary shaped slot 44 in the sides of lower mold 14. The top of blade 38 is normally situated so that it is flush with the horizontal surface of ledge 26. Means are provided for lifting the blade 38 from this position to contact the part flange 22 to remove the part 20 from the mold as will be described. In this embodiment this is accomplished by way of lifter rods 46 connected at their upper ends to blades 38 and at their lower ends to a vertically movable plate 48. As shown most clearly in FIG. 7 blade 38 is connected by way of flathead screws 50 passing through counter sunk-holes 52 to a block 54. Block 54 is mounted on top of rod 46 vertically offset from blade 38 via threaded bolt 56 passing vertically through block 54 and into a threaded bore formed in rod 46. The lower end of rod 46 is conventionally mounted to plate 48 whose movement is controlled by a hydraulic piston arrangement or the like (not shown).

Upper mold 12 includes an outlet port 58 in its shear side portion for providing a passageway for the injection of coating material. An injection head 60 of conventional design is carried by upper mold 12 and used to inject the coating material at the proper stage of the operation which will now be described.

A charge of SMC material such as a thermosetting glass fiber reinforced polyester resin is placed on the upper surface 18 of the lower mold 14. The weight and distribution of the SMC charge depends on such factors as the size and configuration of the part and their determination is well within the skill of the ordinary practitioner. The molds are heated and then closed under pressure to the position shown in FIG. 3. This causes the SMC charge to flow and fill the cavity defined by the upper mold 12 and lower mold 14. In particular, the charge flows onto the ledge portion 26 of the lower mold 14 and into the undercut portion 28 to form the part flange 22. The molds remain closed for a sufficient period of time to cure the resin into a solid state. By way of a nonlimiting example, the molds are heated to 290-310 degrees Farenheit at a pressure of 1200-1500 psi for one and a half-two and a half minutes. More particularly, satisfactory results have been achieved by heating the mold to 300 degrees Farenheit under 1500 psi pressure for one minute and 40 seconds.

After the part 20 has cured to a solid state, the upper mold 12 is raised to bring the outlet port 58 to a position above the upper surface 24 of part 20 as shown in FIG. 4. Ordinarily, when the upper mold 12 is lifted the part 20 has a tendency to stick to it and lift up or shift its position relative to the lower mold 14. However, undercut portion 28 provides the flange 22 with a lip 62 which interferes with the overhanging portion of the lower mold. The flange lip 62 thus serves to lock the part 20 onto the lower mold 14 and prevent it from lifting during this stage of the operation.

With the part 20 securely placed on lower mold 14, the coating material is then injected onto the upper surface 24 of the part. This coating material can be any suitable fluid which serves to fill in pits, pores or cracks that may be present in the upper part surface 24. The coating material is preferably a thermosetting polymeric coating such as a one component unsaturated polyester based resin. Other coating materials such as the commerically available GEN-GLAZE coating from General Tire and Rubber consisting of a combination of unsaturated polyester and polyether urethane resins is an example of another coating material that may be used. After the coating material has been injected, the molds are again closed to cure the coating material. Again, the times, temperatures and pressure may vary but typically, the molds are heated to the same temperature (about 300 degrees F.) and held at a pressure of 200-300 psi for about 20-40 seconds to cure the coating material.

After the coating material 64 has cured, the upper mold 12 is raised to its fully open position. Plate 48 is then raised causing the ejector blades 38 to contact the down turned part flange 22 as shown in FIG. 4. The upward force of blades 38 tend to bend flange 22 outwardly to a sufficient extent to overcome the interference fit provided by lip 62. The dove tailed edges of blade 38 are restrained from deviating from its vertical alignment due to the conforming configuration of the slots 44 in which the blades ride. The blades 38 are raised a sufficient distance to fully release the part 20 from the lower mold so that the in-mold coated part may be removed from the mold. The ejector devices are then retracted and the mold is ready to perform another similar operation.

As shown in FIG. 6, the force of the ejector blades 38 may cause a slight indentation 66 in the lower surface of the part flange 22. However, blemishes or distortions on the coated upper surface 24 due to ejection of the part from the mold are substantially eliminated or at least very difficult to detect. This is due to the fact that the ejector blades 38 contact only the flange 22 on the periphery of the part and not an interior location where the force of the blades during ejection can "show through" on the coated major surface which is desired to be provided with a Class A finish. The increased thickness of the flange 22 helps to prevent the compression forces disturbing the configuration of the opposite surface. Even if a limited amount of distortion does occur, it will be located on the curved radius 21 of the part corners where it is very difficult to detect.

Those skilled in the art should now come to appreciate that the present invention overcomes some major problems that have plagued in-mold coating operations in the past. Both the part lifting problem and ejector pin "show-through" problem have been solved with very little additional expense and without changing the basic molding operational steps. It should be understood that while this invention has been described in connection with particular examples thereof, other modifications will become apparent to the skilled practitioner upon a study of the specification, drawings and following claims.

I claim:

1. Apparatus for compression molding parts so as to provide them with extremely smooth finishes, said apparatus comprising:

a male mold member and a female mold member having complimentary surfaces defining a cavity approximating the shape of the desired part, said part being characterized by an enlarged generally flat major surface which is desired to be provided with the smooth finish, said male mold member including a ledge portion formed in at least one side to define a down turned flange on outer extremities of the part, said male mold member further including an undercut portion in the mold side adjacent said ledge extending at an angle to the path of relative travel between the female and male mold members;

means for moving the mold members to a closed position for curing the part into a solid state, with the part including a lip on the flange due to the provision of the undercut portion in the male mold member;

means for separating the mold members to a partially opened condition, with said lip of the flange serving to retain the part onto the male mold;

injector means for injecting a coating material onto the top surface of the part;

means for subsequently moving the mold members back to said closed position to cure the coating material;

means for opening the mold members; and ejection means for pressing upwardly on the down turned flange to lift the part from the male mold in such manner so as to not destroy the smooth finish on the coated major surface of the part.

2. The apparatus of claim 1 wherein said ejector means is located beneath a rounded corner portion on the periphery of the part.

3. The apparatus of claim 1 wherein said ejection means includes a blade riding in a slot formed in sides of the male mold beneath said ledge, and guide means for maintaining said blade in the slot during lifting of the part from the mold.

4. The apparatus of claim 1 wherein said ledge extends substantially the entire length of opposite sides of the male mold member.

5. The apparatus of claim wherein said guide means includes dove tailed edges on the blade and wherein said slot is complimentary shaped with said edges.

6. The apparatus of claim 5 wherein said blades are connected to lifting rods offset from the plane of its respective blade.

7. Apparatus for compression molding parts so as to provide them with extremely smooth finishes, said apparatus comprising:

a male mold member and a female mold member having complimentary surfaces defining a cavity approximating the shape of the desired part, said part being characterized by an enlarged generally flat major surface which is desired to be provided with the smooth finish, said male mold member including a ledge portion formed in at least one side to define a down turned flange on outer extremities of the part, said male mold member further including an undercut portion in the mold side adjacent said ledge extending at an angle to the path of relative travel between the female and male mold members;

means for moving the mold members to a closed position for curing the part into a solid state, with the part including a lip on the flange due to the provision of the undercut portion in the male mold member;

means for separating the mold members to a partially opened condition, with said lip of the flange serving to retain the part onto the male mold;

injector means for injecting a coating material onto the top surface of the part;

means for subsequently moving the mold members back to said closed position to cure the coating material;

means for opening the mold members; and ejection means for pressing upwardly on the down turned flange to lift the part from the male mold in such manner so as to not destroy the smooth finish on the coated major surface of the part, said ejection means including a blade riding in a slot formed in sides of the male mold beneath said ledge, and guide means for maintaining said blade in the slot during lifting of the part from the mold.

8. The apparatus of claim 7 wherein said guide means includes dove tailed edges on the blade and wherein said slot is complimentary shaped with said edges.

9. The apparatus of claim 7 wherein said blades are connected to lifting rods offset from the plane of its respective blade.

10. Apparatus for compression molding plastic parts and providing an in-mold coating on one side of the parts so as to provide the parts with an extremely smooth finish on said side thereof, said apparatus comprising:

male and female mold members having complimentary surfaces defining a cavity approximating the desired shape of the part, said male mold member including a ledge portion formed in at least one side to define a down turned flange on outer peripheral extremities of the part, said male mold member further including an undercut portion in the mold side adjacent said ledge, said undercut portion extending inwardly at an angle to the path of relative travel between the female and male mold members;

means for moving the mold members to a closed position for curing the part into a solid state, with the part including a lip on the flange due to the provision of the undercut portion in the male mold member;

means for separating the mold members to a partially opened condition, with said flange serving to retain the part onto the male mold;

injector means for injectiong a coating material between the part and the female mold member;

means for subsequently moving the mold members back to said closed postion to cure the coating material;

means for opening the mold members; and ejection means for pressing upwardly on the down turned flange to lift the part from the male mold in such manner so as to not destroy the smooth finish on the coated surface of the part.

* * * * *